(No Model.)
J. W. PARKER & D. R. McCAY.
FAN AND CANOPY ATTACHMENT FOR THRASHING MACHINES.
No. 419,129. Patented Jan. 7, 1890.
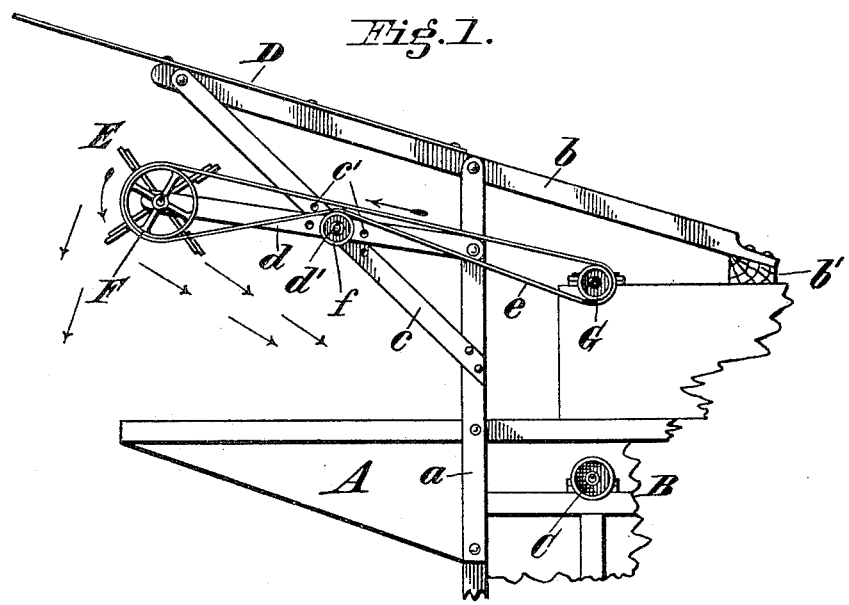
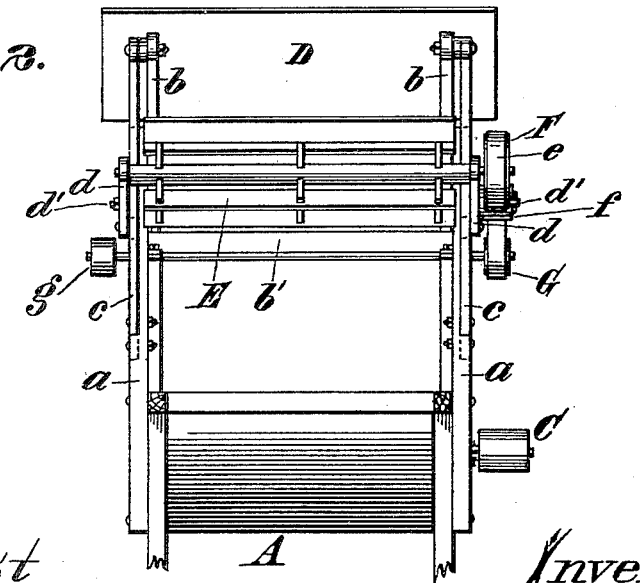

UNITED STATES PATENT OFFICE.

JOHN WILLIAM PARKER, OF CINCINNATI, AND DOUGLAS R. McCAY, OF CENTREBURG, OHIO.

FAN AND CANOPY ATTACHMENT FOR THRASHING-MACHINES.

SPECIFICATION forming part of Letters Patent No. 419,129, dated January 7, 1890.

Application filed July 13, 1889. Serial No. 317,420. (No model.)

*To all whom it may concern:*

Be it known that we, JOHN WILLIAM PARKER and DOUGLAS R. McCAY, citizens of the United States, and residents, respectively, of Cincinnati, in the county of Hamilton and State of Ohio, and Centreburg, in the county of Knox and said State, have invented a Combined Fan and Canopy Attachment for Thrashing-Machines, of which the following is a specification.

Our invention relates to improvements in devices for attachment to the feed ends of thrashing-machines, all of which will be fully described hereinafter, and particularly pointed out in the claims.

In the accompanying drawings, Figure 1 is a broken side elevation of the feed end of a thrashing-machine, showing our improvements applied thereto; and Fig. 2, a front elevation or fore end view of the same.

A represents the usual feed opening or chute of a thrasher; B, the side frame of the machine, and C the customary driving-pulley on the outer end of the thrasher-cylinder shaft.

$a\ a$ represent uprights or standards attached to both sides of the machine just forward of the thrasher-cylinder.

$b\ b$ represent two inclined bars projecting forwardly from the transverse frame-bar $b'$ and supported centrally by the standards $a$.

$c\ c$ represent inclined brace-bars, whose outer or upper ends are secured to the outer ends of the bars $b\ b$, and whose inner or lower ends are preferably let into and secured to the standards $a\ a$ about mid-height.

D represents a transverse board or canvas stretched across the opening between the forwardly-projecting bars $b$, and suitably attached at its opposite ends to said bars, thereby forming a canopy or screen over the attendant who feeds the machine, to shield him from the heat and blinding light of the sun.

$d\ d$ represent two forwardly-projecting bars or arms attached at their inner ends to the standards $a$, and connected by bolts $d'$ with the brace-bars $c\ c$ midway between their respective ends.

E represents an ordinary rotary fan, whose shaft journals in the outer ends of the bars or arms $d\ d$, and is provided with a fast pulley F on one of its ends, which projects beyond its supporting-bar $d$.

G is a driving-pulley suitably mounted on a shaft journaling in the frame of the machine, and connected by an endless belt $e$ with said pulley F for imparting rotary motion to the fan.

$f$ is a roller mounted on one of the bolts $d'$, to form an idler for taking up and supporting the slack in belt $e$, as clearly shown in Fig. 1.

We prefer to mount the fan so that it may be raised or lowered to suit the height of the feed-chute, the height and convenience of the attendant, and also the kind and nature of the grain. In order to accomplish this desirable feature, we pivotally connect the inner ends of bars $d\ d$ with the standards $a$, and provide additional holes $c'$ in both sets of bars $c\ c$ and $d\ d$ concentric with the pivotal ends of said bars $d\ d$. The holes in bars $c\ c$ are arranged so that they register with those in bars $d\ d$ when said bars $c\ c$ and the rotary fan are raised and lowered, and are then in position to accommodate the bolts $d'$, one of which forms a stud or shaft for the idler-roller $f$, as hereinbefore stated.

The shaft upon which the fan-driving pulley G is mounted passes transversely through the machine, and is provided at its opposite end with a pulley $g$, connected with any desirable rotating part of the machine in any desirable manner for the requisite power to drive it.

It will be seen that in the operation of the fan portion of our attachment the current or blast of air therefrom is directed toward the mouth of the machine, owing to the fact that the canopy above and the feed-chute below act as portions of a casing; which, in connection with the suction caused by the rapid rotation of the cylinder in the machine, naturally causes the current generated by the fan to move in that direction; but as the supply of air is cut off by the canopy and feed-chute fresh air is drawn in from the position occupied by the attendant of the machine and from the space to the rear of him, and thus drives the dust arising from the feeding grain away from the attendant and simultaneously keeps him cool without exposing him to the draft, as would be the case with a closed fan located directly above his head or to the rear of him, which would also act as a collector for any dust that might be in the air and force it against him with the strong current thus generated. Both the canopy and fan attachments may be readily attached or detached, either in connection with old machines in general use or with new ones about to be put in use or on sale. It will also be seen that the overhanging skeleton frame, upon which the fan and canopy are mounted, constructed as herein shown and described, would not in any manner interfere with the ready and proper feeding of the grain or the delivery of the bundles or sheaves from the field or pile to the feeding attendant.

We claim—

1. A combined fan and canopy attachment for thrashing-machines, composed of the open rotary fan E and screen or canopy D, mounted on the skeleton frame $a\ b\ c\ d$, which in turn is mounted on the forward end of the machine immediately over the feeding-chute, the said fan being provided with suitable driving mechanism, and all the parts being constructed and arranged substantially as and for the purpose specified.

2. In an open rotary-fan attachment for thrashing-machines, the overhanging skeleton mounting-frame $a\ b\ c\ d$, having pivotal bars or arms $d\ d$ adjustably connected with the brace-bars $c\ c$ by bolts $d'$, and a series of holes $c'$, whereby said fan is adapted to be raised or lowered, substantially as and for the purpose specified.

3. In a cooling and dust fan attachment for thrashing-machines, the combination of a skeleton frame composed of the standards $a$, bars $b$, brace-bars $c$, and bars or arms $d$, and an open revolving fan mounted upon said frame so as to overhang the feed-chute of said machine, substantially in the manner and for the purpose specified.

4. The combination, with the feed-chute of a thrashing-machine, of an overhanging skeleton frame composed of the bars $a$, $b$, and $c$, and a board or screen D, mounted upon said skeleton frame, substantially as and for the purpose specified.

In testimony of which invention we have hereunto set our hands.

JOHN WILLIAM PARKER.
DOUGLAS R. McCAY.

Witnesses:
JOHN E. JONES,
C. B. DONALDSON.